United States Patent
Zhang et al.

(10) Patent No.: US 11,146,484 B2
(45) Date of Patent: Oct. 12, 2021

(54) METHOD, DEVICE, AND SYSTEM FOR DEFERRING SWITCHBACK

(71) Applicant: Huawei Technologies Co., Ltd., Shenzhen (CN)

(72) Inventors: Yaokun Zhang, Beijing (CN); Chunxia Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 696 days.

(21) Appl. No.: 15/614,057

(22) Filed: Jun. 5, 2017

(65) Prior Publication Data
US 2017/0272358 A1   Sep. 21, 2017

Related U.S. Application Data

(63) Continuation of application No. PCT/CN2015/088979, filed on Sep. 6, 2015.

(30) Foreign Application Priority Data
Dec. 5, 2014   (CN) .......................... 201410736357.6

(51) Int. Cl.
*H04L 12/703* (2013.01)
*H04L 12/24* (2006.01)
*H04L 12/707* (2013.01)

(52) U.S. Cl.
CPC .......... *H04L 45/28* (2013.01); *H04L 41/0816* (2013.01); *H04L 45/22* (2013.01); *H04L 41/0654* (2013.01)

(58) Field of Classification Search
None
See application file for complete search history.

(56) References Cited

U.S. PATENT DOCUMENTS

2003/0088698 A1* 5/2003 Singh .................. H04L 12/4641
                                                      709/239
2004/0128201 A1* 7/2004 Ofir ........................ G06Q 20/04
                                                      705/17
(Continued)

FOREIGN PATENT DOCUMENTS

CN          101436975 A      5/2009
CN          101651553 A      2/2010
(Continued)

OTHER PUBLICATIONS

Machine Translation and Abstract of Chinese Publication No. CN101436975, May 20, 2009, 22 pages.
(Continued)

*Primary Examiner* — Scott B Christensen
(74) *Attorney, Agent, or Firm* — Conley Rose, P.C.

(57) ABSTRACT

A method, a device, and a system for deferring a switchback. A first network device sends a query packet to a second network device, detects, according to the query packet, whether a route from the second network device to a destination device is available after receiving the query packet, and when it is available, the second network device sends a query response packet to the first network device in order to trigger the first network device to switch back from a secondary route to a primary route. The technical solution provided reduces a wait-to-restore time of the switchback, ensures that service data transmitted from the first network device to the second network device can be transmitted to the destination device, and facilitates smooth transmission of the service data.

20 Claims, 7 Drawing Sheets

(56) References Cited

U.S. PATENT DOCUMENTS

| | | | | |
|---|---|---|---|---|
| 2006/0198321 | A1* | 9/2006 | Nadeau | H04L 43/50 370/254 |
| 2008/0181233 | A1* | 7/2008 | Washam | H04L 12/2859 370/395.5 |
| 2008/0219273 | A1* | 9/2008 | Kaneko | H04L 45/00 370/401 |
| 2011/0007652 | A1* | 1/2011 | Bai | H04L 45/02 370/252 |
| 2012/0113799 | A1 | 5/2012 | Chen et al. | |
| 2012/0182862 | A1 | 7/2012 | Cirkovic | |
| 2013/0016606 | A1* | 1/2013 | Cirkovic | H04L 43/0811 370/225 |
| 2014/0016458 | A1 | 1/2014 | Moritomo | |
| 2014/0056122 | A1* | 2/2014 | Singal | H04L 41/0668 370/220 |
| 2015/0138958 | A1* | 5/2015 | Shao | H04L 43/0811 370/228 |
| 2015/0186202 | A1 | 7/2015 | Wang | |

FOREIGN PATENT DOCUMENTS

| | | |
|---|---|---|
| CN | 101651691 A | 2/2010 |
| CN | 101883038 A | 11/2010 |
| CN | 102006268 A | 4/2011 |
| CN | 102195861 A | 9/2011 |
| CN | 102752172 A | 10/2012 |
| CN | 103516612 A | 1/2014 |
| CN | 103580904 A | 2/2014 |
| CN | 104184661 A | 12/2014 |
| CN | 104518960 A | 4/2015 |
| EP | 2466804 A1 | 6/2012 |
| WO | 2013065477 A1 | 5/2013 |

OTHER PUBLICATIONS

Machine Translation and Abstract of Chinese Publication No. CN101651691, Feb. 17, 2010, 24 pages.
Machine Translation and Abstract of Chinese Publication No. CN102006268, Apr. 6, 2011, 24 pages.
Machine Translation and Abstract of Chinese Publication No. CN102195861, Sep. 21, 2011, 12 pages.
Machine Translation and Abstract of Chinese Publication No. CN102752172, Oct. 24, 2012, 14 pages.
Machine Translation and Abstract of Chinese Publication No. CN103516612, Jan. 15, 2014, 13 pages.
Machine Translation and Abstract of Chinese Publication No. CN104184661, Dec. 3, 2014, 9 pages.
Machine Translation and Abstract of Chinese Publication No. CN104518960, Apr. 15, 2015, 35 pages.
Foreign Communication From a Counterpart Application, Chinese Application No. 201410736357.6, Chinese Office Action dated May 3, 2017, 5 pages.
Foreign Communication From a Counterpart Application, PCT Application No. PCT/CN2015/088979, English Translation of International Search Report dated Dec. 2, 2015, 2 pages.
Foreign Communication From a Counterpart Application, PCT Application No. PCT/CN2015/088979, English Translation of Written Opinion dated Dec. 2, 2015, 6 pages.
Machine Translation and Abstract of International Publication No. WO2013065477, May 10, 2013, 48 pages.
Foreign Communication From a Counterpart Application, European Application No. 15865096.0, Extended European Search Report dated Oct. 18, 2017, 9 pages.

* cited by examiner

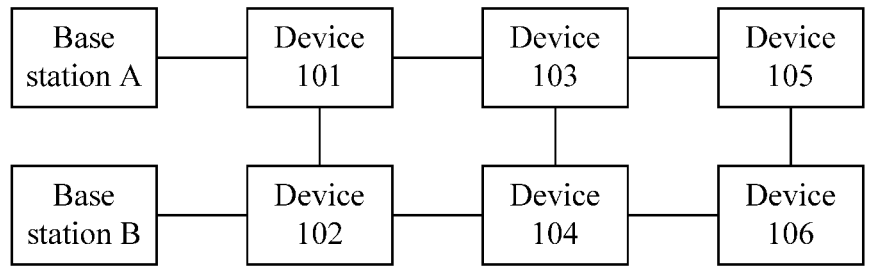

FIG. 1

A first network device sends a query packet to a second network device, where the query packet triggers the second network device to detect whether a route from the second network device to a destination device is available, and the second network device is a primary network device — 201

The first network device receives a query response packet sent by the second network device, and the first network device switches back from a secondary route to a primary route, where the query response packet indicates availability of the route between the second network device and the destination device — 202

FIG. 2

METHOD, DEVICE, AND SYSTEM FOR DEFERRING SWITCHBACK

CROSS-REFERENCE TO RELATED APPLICATIONS

This application is a continuation of International Patent Application No. PCT/CN2015/088979 filed on Sep. 6, 2015, which claims priority to Chinese Patent Application No. 201410736357.6 filed on Dec. 5, 2014. The disclosures of the aforementioned applications are hereby incorporated by reference in their entireties.

TECHNICAL FIELD

The present disclosure relates to the field of communications technologies, and in particular, to a method, a device, and a system for deferring a switchback.

BACKGROUND

A radio access network (RAN) based on a packet transport network (PTN) mainly uses a static routing technology. Labels of various network nodes, routes, and the like are all configured statically.

FIG. 1 is a schematic structural diagram of a PTN RAN network. The PTN RAN network includes an access ring and an aggregation ring. As shown in FIG. 1, a device 101, a device 102, a device 103, and a device 104 form the access ring. The device 103, the device 104, a device 105, and a device 106 form the aggregation ring. The device 101 and the device 102 are low-end PTN devices to which base stations are connected. The two devices belong to a layer-2 network only, and are referred to as user-end provider edge (UPE) devices. Virtual leased lines (VLL) are deployed for the device 101 and the device 102, and the two devices are dual-homed to the device 103 and the device 104. The device 103 and the device 104 are high-end PTN devices, belong to both the layer-2 network and a layer-3 network, and are referred to as superstratum provider edge (SPE) devices. The device 103 and the device 104 connect the VLLs to a layer-3 virtual private network (L3VPN) to convert a layer-2 network service to a layer-3 network service. The device 105 and the device 106 are also high-end PTN devices to which mobility management entity (MME) devices or signaling gateways (SGW) are connected. The two devices belong to the layer-3 network only, and are referred to as network provider edge (NPE) devices. In the aggregation ring, the L3VPN performs service data transmission between an SPE device and an NPE device.

If an SPE node in the PTN RAN network is faulty, service data transmission between the layer-2 network and the layer-3 network is interrupted. To improve reliability of service data transmission on the PTN RAN network, a virtual private network (VPN) fast reroute (VPN FRR) needs to be deployed on an NPE node. For example, a VPN FRR is deployed on the device 105. In static routes from the device 105 to a base station A, the one from the device 105 to the device 103 is a primary route for service data transmission, and the one from the device 105 to the device 104 is a secondary route for service data transmission. When the device 103 is faulty, a network management function, such as Operations, Administration, and Maintenance (OAM) on the device 105 detects that a traffic engineering (TE) tunnel between the device 103 and the device 105 is faulty. The device 105 switches from the primary route to the secondary route, and using the secondary route, the device 105 transmits, to the base station A, service data to be sent to the base station A. When the TE tunnel between the device 105 and the device 103 is restored, the device 105 switches back from the secondary route to the primary route, and using the primary route, the device 105 transmits service data to be sent to the base station A.

However, in some other approaches, when the TE tunnel between the device 105 and the device 103 is restored, the primary route between the device 105 and the device 103 takes effect immediately. In this case, a route from the device 103 to the base station may not be restored yet. If a VPN FRR switchback is triggered immediately in this case, the device 105 switches back from the secondary route to the primary route, and after the device 103 receives service data transmitted by the device 105 using the primary route, the service data cannot be transmitted to the base station A. Consequently, the service data is lost.

Currently, to resolve the problem that the service data is lost after the VPN FRR switchback is performed on the NPE device, a person skilled in the art sets a sufficiently long wait-to-restore time of the VPN FRR switchback to ensure that the route from the SPE device to the base station A is available within an extended time.

However, because the wait-to-restore time of the VPN FRR switchback is set to be sufficiently long, service data of the NPE device is transmitted on the secondary route within a long time, and service data congestion is caused on the secondary route. In addition, after troubleshooting the SPE device, if a connection between the SPE device and another device is faulty (a board of the other device cannot be registered with the SPE device), service data transmission is continually interrupted. Even if the wait-to-restore time of the VPN FRR switchback is set to be sufficiently long, the problem that service data transmission is continually interrupted cannot be resolved.

SUMMARY

Embodiments of the present disclosure provide a method, a device, and a system for deferring a switchback. When a route between a second network device and a destination device is available, a first network device is triggered to switch back from a secondary route to a primary route. Therefore, a problem that service data congestion occurs on the secondary route because a set wait-to-restore time of the switchback is excessively long is resolved, and a problem that service data transmission is continually interrupted because the route from the second network device to the destination device cannot be restored is avoided.

Therefore, technical solutions for resolving the technical problems in the present disclosure are as follows.

A first aspect of the embodiments of the present disclosure provides a method for deferring a switchback, where the method includes sending, by a first network device, a query packet to a second network device, where the query packet triggers the second network device to detect whether a route from the second network device to a destination device is available, and the second network device is a primary network device, and receiving, by the first network device, a query response packet sent by the second network device, and switching back, by the first network device, from a secondary route to a primary route, where the query response packet indicates availability of the route between the second network device and the destination device, a destination address of the secondary route is an Internet Protocol (IP) address of the destination device, a next hop of the secondary route is a third network device, a destination address of the primary route is the IP address of the destination device, a next hop of the primary route is the second network device, and the third network device is a secondary network device for the second network device.

In a first possible implementation manner of the first aspect of the embodiments of the present disclosure, before sending, by a first network device, a query packet to a second network device, the method further includes restoring, by the first network device, a TE tunnel connection to the second network device after troubleshooting the second network device.

With reference to the first aspect to the first possible implementation manner of the first aspect of the embodiments of the present disclosure, in a second possible implementation manner, switching back, by the first network device, from a secondary route to a primary route, includes creating, by the first network device, a forwarding entry of the primary route, activating the forwarding entry, and forwarding, by the first network device, a data packet to the second network device using the forwarding entry.

With reference to the first aspect to the first possible implementation manner of the first aspect of the embodiments of the present disclosure, in a third possible implementation manner, before sending, by a first network device, a query packet to the second network device, the method further includes generating, by the first network device, a forwarding entry of the primary route.

With reference to the third possible implementation manner of the first aspect of the embodiments of the present disclosure, in a fourth possible implementation manner, switching back, by the first network device, from a secondary route to a primary route, includes activating, by the first network device, the forwarding entry, and forwarding, by the first network device, a data packet to the second network device using the forwarding entry.

With reference to the first aspect to the fourth possible implementation manner of the first aspect of the embodiments of the present disclosure, in a fifth possible implementation manner, the first network device is an NPE device or a provider edge (PE) device, and the second network device and the third network device are SPE devices or NPE devices.

A second aspect of the embodiments of the present disclosure provides a method for deferring a switchback, where the method includes receiving, by a second network device, a query packet sent by a first network device, where the second network device is a primary network device, detecting, by the second network device according to the query packet, whether a route from the second network device to a destination device is available, and sending, by the second network device, a query response packet to the first network device when the route from the second network device to the destination device is available, where the query response packet triggers the first network device to switch back from a secondary route to a primary route, a destination address of the secondary route is an IP address of the destination device, a next hop of the secondary route is a third network device, a destination address of the primary route is the IP address of the destination device, a next hop of the primary route is the second network device, and the third network device is a secondary network device for the second network device.

In a first possible implementation manner of the second aspect of the embodiments of the present disclosure, detecting, by the second network device according to the query packet, whether a route from the second network device to a destination device is available, includes querying, by the second network device, whether a backup of an Address Resolution Protocol (ARP) table from the third network device is completed, and querying, by the second network device, whether an ARP entry corresponding to the IP address of the destination device exists in the backup ARP table when the second network device completes the backup of the ARP table from the third network device.

In a second possible implementation manner of the second aspect of the embodiments of the present disclosure, detecting, by the second network device according to the query packet, whether a route from the second network device to a destination device is available, includes generating, by the second network device, an ARP table using a preset ARP configuration file, and querying, by the second network device, whether an ARP entry corresponding to the IP address of the destination device exists in the ARP table.

With reference to the first possible implementation manner to the second possible implementation manner of the second aspect of the embodiments of the present disclosure, in a third possible implementation manner, the method further includes detecting, by the second network device, whether a pseudo wire (PW) from the second network device to a fourth network device is available when the ARP entry corresponding to the IP address of the destination device exists, where the fourth network device is connected to the destination device.

With reference to the first possible implementation manner to the second possible implementation manner of the second aspect of the embodiments of the present disclosure, in a fourth possible implementation manner, the method further includes detecting, by the second network device, whether a protection PW from the second network device to the third network device is available when the ARP entry corresponding to the IP address of the destination device exists, where the protection PW is an inter-chassis backup (ICB) PW or a dual-node interconnection (DNI) PW.

With reference to the second aspect to the fourth possible implementation manner of the second aspect of the embodiments of the present disclosure, in a fifth possible implementation manner, the first network device is an NPE device or a PE device. The second network device and the third network device are SPE devices or NPE devices, and the fourth network device is a UPE device.

A third aspect of the embodiments of the present disclosure provides a method for deferring a switchback, where the method includes obtaining, by the second network device, association information after troubleshooting a second network device, where the association information includes an IP address of a destination device and an identity of a first network device, the association information indicates that the second network device is a next-hop device of a primary route on the first network device, and a destination address of the primary route is the IP address of the destination device, obtaining, by the second network device, a restored ARP table, querying, by the second network device, the restored ARP table, and obtaining the IP address of the destination device in an ARP entry, where the IP address of the destination device identifies the destination device, querying, by the second network device, whether a route to the destination device is available, obtaining, by the second network device from the association information, the identity of the first network device corresponding to the IP address of the destination device when the route from the second network device to the destination device is available, establishing, by the second network device, a primary route to the first network device, and triggering the first network device to switch back from a secondary route to the primary route, where a destination address of the secondary route is the IP address of the destination device, a next hop of the secondary route is a third network device, and the third network device is a secondary network device for the second network device.

In a first possible implementation manner of the third aspect of the embodiments of the present disclosure, obtaining, by the second network device, a restored ARP table, includes backing up, by the second network device, an ARP table from the third network device, and using the backup ARP table as the restored ARP table, or generating, by the second network device, an ARP table using a preset ARP configuration file, and setting the generated ARP table as the restored ARP table.

With reference to the third aspect to the first possible implementation manner of the third aspect of the embodiments of the present disclosure, in a second possible implementation manner, querying, by the second network device, whether a route to the destination device is available, includes detecting, by the second network device, whether a PW from a primary SPE device to a fourth network device is available, where the fourth network device is connected to the destination device.

With reference to the third aspect to the first possible implementation manner of the third aspect of the embodiments of the present disclosure, in a third possible implementation manner, querying, by the second network device, whether a route to the destination device is available, includes detecting, by the second network device, whether a protection PW from the second network device to the third network device is available, where the protection PW is an ICB PW or a DNI PW.

With reference to the third aspect to the third possible implementation manner of the third aspect of the embodiments of the present disclosure, in a fourth possible implementation manner, the first network device is an NPE device or a PE device. The second network device and the third network device are SPE devices or NPE devices, and the fourth network device is a UPE device.

A fourth aspect of the embodiments of the present disclosure provides a first network device for deferring a switchback, where the first network device includes a sending unit configured to send a query packet to a second network device, where the query packet triggers the second network device to detect whether a route from the second network device to a destination device is available, and the second network device is a primary network device, a receiving unit configured to receive a query response packet sent by the second network device, and send the query response packet to a processing unit, and the processing unit configured to generate the query packet, send the query packet to the sending unit, and switch back from a secondary route to a primary route after the receiving unit receives the query response packet sent by the second network device, where the query response packet indicates availability of the route between the second network device and the destination device, a destination address of the secondary route is an IP address of the destination device, a next hop of the secondary route is a third network device, a destination address of the primary route is the IP address of the destination device, a next hop of the primary route is the second network device, and the third network device is a secondary network device for the second network device.

In a first possible implementation manner of the fourth aspect of the embodiments of the present disclosure, the processing unit is further configured to restore, a TE tunnel connection to the second network device after troubleshooting the second network device and before the query packet is sent to the second network device.

With reference to the fourth aspect to the first possible implementation manner of the fourth aspect of the embodiments of the present disclosure, in a second possible implementation manner, that the processing unit is configured to switch from a secondary route to a primary route includes creating a forwarding entry of the primary route, activating the forwarding entry, and forwarding a data packet to the second network device using the forwarding entry.

With reference to the fourth aspect to the first possible implementation manner of the fourth aspect of the embodiments of the present disclosure, in a third possible implementation manner, the processing unit is further configured to generate a forwarding entry of the primary route.

With reference to the third possible implementation manner of the fourth aspect of the embodiments of the present disclosure, in a fourth possible implementation manner, that the processing unit is configured to switch from a secondary route to a primary route includes activating the forwarding entry, and forwarding a data packet to the second network device using the forwarding entry.

With reference to the fourth aspect to the fourth possible implementation manner of the fourth aspect of the embodiments of the present disclosure, in a fifth possible implementation manner, the first network device is an NPE device or a PE device, and the second network device and the third network device are SPE devices or NPE devices.

A fifth aspect of the embodiments of the present disclosure provides a second network device for deferring a switchback, where the second network device includes a receiving unit configured to receive a query packet sent by a first network device, and send the query packet to a processing unit, where the second network device is a primary network device. The processing unit configured to detect, according to the query packet, whether a route from the second network device to a destination device is available, and a sending unit configured to send a query response packet to the first network device when the route from the second network device to the destination device is available, where the query response packet triggers the first network device to switch back from a secondary route to a primary route, a destination address of the secondary route is an IP address of the destination device, a next hop of the secondary route is a third network device, a destination address of the primary route is the IP address of the destination device, a next hop of the primary route is the second network device, and the third network device is a secondary network device for the second network device.

In a first possible implementation manner of the fifth aspect of the embodiments of the present disclosure, that the processing unit is configured to detect, according to the query packet, whether a route from the second network device to a destination device is available, includes the second network device queries whether a backup of an ARP table from the third network device is completed, and when the second network device completes the backup of the ARP table from the third network device, the second network device queries whether an ARP entry corresponding to the IP address of the destination device exists in the backup ARP table.

In a second possible implementation manner of the fifth aspect of the embodiments of the present disclosure, that the processing unit is configured to detect, according to the query packet, whether a route from the second network device to a destination device is available, includes the second network device generates an ARP table using a preset ARP configuration file, and the second network device queries whether an ARP entry corresponding to the IP address of the destination device exists in the ARP table.

With reference to the first possible implementation manner of the fifth aspect of the embodiments of the present disclosure to the second possible implementation manner of the fifth aspect of the embodiments of the present disclosure, in a third possible implementation manner, the processing unit is further configured to detect whether a PW from the second network device to a fourth network device is available when the ARP entry corresponding to the IP address of the destination device exists, where the fourth network device is connected to the destination device.

With reference to the first possible implementation manner of the fifth aspect of the embodiments of the present disclosure to the second possible implementation manner of the fifth aspect of the embodiments of the present disclosure, in a fourth possible implementation manner, the processing unit is further configured to detect whether a protection PW from the second network device to the third network device is available when the ARP entry corresponding to the IP address of the destination device exists, where the protection PW is an ICB PW or a DNI PW.

With reference to the fifth aspect to the fourth possible implementation manner of the fifth aspect of the embodiments of the present disclosure, in a fifth possible implementation manner, the first network device is an NPE device or a PE device. The second network device and the third network device are SPE devices or NPE devices, and the fourth network device is a UPE device.

A sixth aspect of the embodiments of the present disclosure provides a system for deferring a switchback, where the system includes the first network device for deferring a switchback according to the fourth aspect to the fifth possible implementation manner of the fourth aspect of the embodiments of the present disclosure and the second network device for deferring a switchback according to the fifth aspect to the fifth possible implementation manner of the fifth aspect of the embodiments of the present disclosure.

A seventh aspect of the embodiments of the present disclosure provides a second network device for deferring a switchback, where the second network device includes a processing unit configured to obtain association information after troubleshooting, where the association information includes an IP address of a destination device and an identity of a first network device, the association information indicates that the second network device is a next-hop device of a primary route on the first network device, and a destination address of the primary route is the IP address of the destination device, obtain a restored ARP table, query the restored ARP table, obtain the IP address of the destination device in an ARP entry, where the IP address of the destination device is used to identify the destination device, query whether a route to the destination device is available, obtain, from the association information, the identity of the first network device corresponding to the IP address of the destination device when the route from the second network device to the destination device is available, establish a primary route to the first network device, and trigger the first network device to switch back from a secondary route to the primary route, where a destination address of the secondary route is the IP address of the destination device, a next hop of the secondary route is a third network device, and the third network device is a secondary network device for the second network device.

In a first possible implementation manner of the seventh aspect of the embodiments of the present disclosure, that the processing unit is configured to obtain a restored ARP table includes the second network device backs up an ARP table from the third network device, and sets the backup ARP table as the restored ARP table, or the second network device generates an ARP table using a preset ARP configuration file, and sets the generated ARP table as the restored ARP table.

With reference to the first possible implementation manner of the seventh aspect of the embodiments of the present disclosure, in a second possible implementation manner, that the processing unit queries whether a route to the destination device is available includes the second network device detects whether a PW from a primary SPE device to a fourth network device is available, where the fourth network device is connected to the destination device.

With reference to the first possible implementation manner of the seventh aspect of the embodiments of the present disclosure, in a third possible implementation manner, that the processing unit queries whether a route to the destination device is available includes the second network device detects whether a protection PW from the second network device to the third network device is available, where the protection PW is an ICB PW or a DNI PW.

With reference to the seventh aspect to the second possible implementation manner of the seventh aspect of the embodiments of the present disclosure, in a third possible implementation manner, the first network device is an NPE device or a PE device. The second network device and the third network device are SPE devices or NPE devices, and the fourth network device is a UPE device.

An eighth aspect of the embodiments of the present disclosure provides a system for deferring a switchback, where the system includes the second network device for deferring a switchback according to the seventh aspect to the third possible implementation manner of the seventh aspect of the embodiments of the present disclosure and a first network device, where the first network device is configured to switch back from a secondary route to the primary route after establishing a primary route to the second network device, where a destination address of the secondary route is an IP address of a destination device, a next hop of the secondary route is a third network device, a destination address of the primary route is the IP address of the destination device, a next hop of the primary route is the second network device, and the third network device is a secondary network device for the second network device. As can be known from the foregoing technical solutions, the embodiments of the present disclosure have the following advantageous effects The embodiments of the present disclosure provide a method, a device, and a system for deferring a switchback. A first network device sends a query packet to a second network device, after receiving the query packet, the second network device detects, according to the query packet, whether a route from the second network device to a destination device is available, and when the route from the second network device to the destination device is available, the second network device sends a query response packet to the first network device in order to trigger the first network device to switch back from a secondary route to a primary route. In the embodiments of the present disclosure, after troubleshooting the second network device, the second network device first detects availability of the route from the second network device to the destination device, and then triggers the first network device to switch back from the secondary route to the primary route, thereby reducing a wait-to-restore time of the switchback, ensuring that service data transmitted from the first network device to the second network device can be transmitted to the destination device, and implementing smooth transmission of the service data.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a schematic structural diagram of a PTN RAN network according to an embodiment of the present disclosure;

FIG. 2 is a flowchart of a method for deferring a switchback according to an embodiment of the present disclosure;

DESCRIPTION OF EMBODIMENTS

Figure 3:
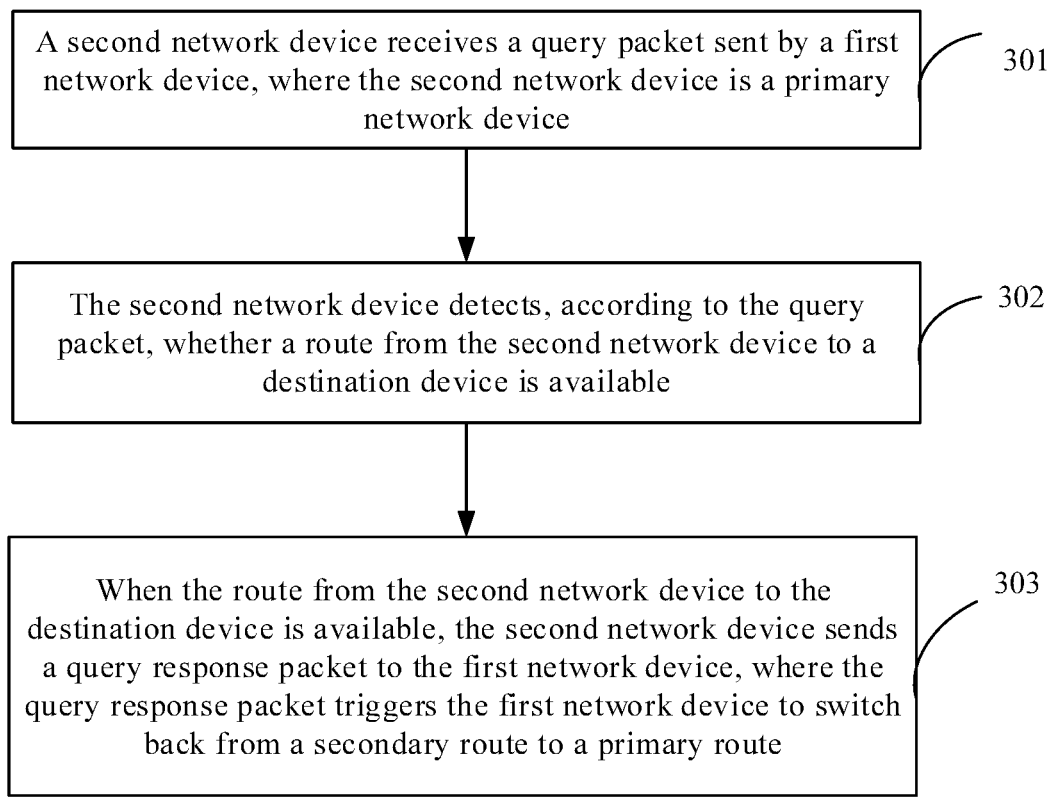
FIG. 3 is a flowchart of a method for deferring a switchback according to an embodiment of the present disclosure.

Embodiments of the present disclosure provide a method, an apparatus, and a system for deferring a switchback. When a route from a second network device to a destination device is available, a first network device is triggered in time to switch back from a secondary route to a primary route, thereby reducing a wait-to-restore time of the switchback, ensuring that service data transmitted from the first network device to the second network device can be transmitted to the destination device, and implementing smooth transmission of the service data.

The method provided by the embodiments of the present disclosure is not only applicable to a VPN but also applicable to an IP bearer network.

The following describes the embodiments of the present disclosure in detail with reference to accompanying drawings.

FIG. 2 is a flowchart of a method for deferring a switchback according to an embodiment of the present disclosure. The method includes the following steps.

Step 201: A first network device sends a query packet to a second network device, where the query packet triggers the second network device to detect whether a route from the second network device to a destination device is available, and the second network device is a primary network device.

Step 202: The first network device receives a query response packet sent by the second network device, and the first network device switches back from a secondary route to a primary route, where the query response packet indicates availability of the route between the second network device and the destination device.

A destination address of the secondary route is an IP address of the destination device, and a next hop of the secondary route is a third network device. A destination address of the primary route is the IP address of the destination device, and a next hop of the primary route is the second network device. The third network device is a secondary network device for the second network device.

After troubleshooting, the second network device is restarted, and after the restart, the second network device establishes a communication connection to the first network device. The first network device sends the query packet to the second network device using the established communication connection. The query packet triggers the second network device to detect whether the route from the second network device to the destination device is available. When the second network device detects that the route to the destination device is available, the first network device receives the query response packet sent by the second network device, and switches back from the secondary route to the primary route.

Two conditions need to be satisfied after the route between the first network device and the second network device takes effect. A first condition is that a forwarding entry is generated at a forwarding layer of the first network device. A second condition is that the forwarding entry is activated. The switchback from the secondary route to the primary route can be performed only when the two conditions are satisfied and the primary route between the first network device and the second network device takes effect. The following describes in detail the switchback deferred by the first network device in two different phases before the primary route takes effect.

In a first application scenario of a Multiprotocol Label Switching (MPLS) L3VPN, before the first network device sends the query packet to the second network device, the method further includes that the first network device restores a TE tunnel connection to the second network device after troubleshooting the second network device.

After troubleshooting the second network device, the second network device performs an OAM negotiation with the first network device to restore the TE tunnel connection to the first network device. After the first network device restores the TE tunnel connection to the second network device, a control layer of the first network device does not deliver a routing entry to the forwarding layer, and the forwarding layer does not generate a forwarding entry, that is, the primary route between the first network device and the second network device cannot take effect, and the switchback from the secondary route to the primary route cannot be performed. The switchback is deferred at the control layer. The first network device sends the query packet to the second network device in order to trigger the second network device to detect whether the route to the destination device is available.

In the first application scenario of the MPLS L3VPN, that the first network device switches back from a secondary route to a primary route includes that the first network device creates a forwarding entry of the primary route, and activates the forwarding entry, and the first network device forwards a data packet to the second network device using the forwarding entry.

After the first network device restores the TE tunnel connection to the second network device, the control layer of the first network device delivers a routing entry to the forwarding layer. Before the forwarding layer generates a forwarding entry according to the routing entry, the first network device sends the query packet to the second network device to defer the switchback. When the route between the second network device and the destination device is available, the first network device receives the query response packet sent by the second network device, and the first network device switches back from the secondary route to the primary route. When the switchback is performed, because only the TE tunnel is established between the first network device and the second network device, the control layer needs to deliver a routing entry to the forwarding layer. The forwarding layer generates a forwarding entry according to the routing entry, and activates the generated forwarding entry, that is, the forwarding entry is set as primary. In this case, the primary route between the first network device and the second network device takes effect, and the first network device switches back from secondary route to the primary route, and forwards a data packet to the second network device using the forwarding entry.

In a second application scenario of the MPLS L3VPN, after the first network device restores the TE tunnel connection to the second network device, and before the first network device sends the query packet to the second network device, the method further includes that the first network device generates a forwarding entry of the primary route.

After troubleshooting the second network device, the first network device performs an OAM negotiation with the second network device to restore a TE tunnel connection to the second network device. After the first network device restores the TE tunnel connection to the second network device, the control layer of the first network device delivers a generated routing entry to the forwarding layer. The forwarding layer generates a forwarding entry, but does not activate the generated forwarding entry, that is, the primary route between the first network device and the second network device cannot take effect, and the switchback from the secondary route to the primary route cannot be performed. The switchback is deferred at the forwarding layer. The first network device sends the query packet to the second network device in order to trigger the second network device to detect whether the route to the destination device is available. Activating the generated forwarding entry is setting the forwarding entry as primary.

In the second application scenario of the MPLS L3VPN, that the first network device switches back from a secondary route to a primary route includes that the first network device activates the forwarding entry, and the first network device forwards a data packet to the second network device using the forwarding entry.

After the first network device restores the TE tunnel connection to the second network device, the control layer of the first network device delivers a routing entry to the forwarding layer. Before the forwarding layer generates a forwarding entry according to the routing entry and activates the generated forwarding entry, the first network device sends the query packet to the second network device to defer the switchback. When the route between the second network device and the destination device is available, the first network device receives the query response packet sent by the second network device, and the first network device switches back from the secondary route to the primary route. Because the control layer of the first network device has delivered the routing entry to the forwarding layer before sending the query packet, the forwarding layer generates the forwarding entry according to the routing entry. When performing the switchback, the first network device activates the generated forwarding entry, that is, the forwarding entry is set as primary. In this case, the primary route between the first network device and the second network device takes effect, and the first network device switches back from the secondary route to the primary route, and forwards a data packet to the second network device using the forwarding entry.

In a first application scenario of an IP bearer network, after troubleshooting the second network, the second network device establishes an IP communication connection to the first network device. After the first network device establishes the IP communication connection to the second network device, the control layer of the first network device does not deliver a routing entry to the forwarding layer, and the forwarding layer cannot generate a forwarding entry. The primary route between the first network device and the second network device does not take effect, and the switchback from the secondary route to the primary route cannot be performed. The switchback is deferred at the control layer. The first network device sends the query packet to the second network device in order to trigger the second network device to detect whether the route to the destination device is available.

The first network device receives the query response packet sent by the second network device when the second network device detects that the route to the destination device is available. The first network device switches from a secondary route to a primary route includes that the first network device creates a forwarding entry of the primary route, and activates the forwarding entry, and the first network device forwards a data packet to the second network device using the forwarding entry.

This is similar to the method for switching from the secondary route to the primary route by the first network device in the first application scenario of the MPLS L3VPN. Refer to the description in the first application scenario of the MPLS L3VPN. Details are not described again herein.

In an application scenario of the IP bearer network, before the first network device sends the query packet to the second network device, the method further includes that the first network device generates a forwarding entry of the primary route.

After troubleshooting the second network device, the second network device establishes an IP communication connection to the first network device. The control layer of the first network device delivers a generated routing entry to the forwarding layer. The forwarding layer generates a forwarding entry, but does not activate the forwarding entry. The primary route between the first network device and the second network device does not take effect, and the switching from the secondary route to the primary route cannot be performed. The switchback is deferred at the forwarding layer. The first network device sends the query packet to the second network device in order to trigger the second network device to detect whether the route to the destination device is available.

When the second network device detects that the route to the destination device is available, the first network device receives the query response packet sent by the second network device. That the first network device switches from a secondary route to a primary route includes the first network device activates the forwarding entry, and the first network device forwards a data packet to the second network device using the forwarding entry.

This is similar to the method for switching from the secondary route to the primary route by the first network device in the second application scenario of the MPLS L3VPN. Refer to the description in the second application scenario of the MPLS L3VPN. Details are not described again herein.

Herein it should be noted that, in an actual application scenario, the first network device may be an NPE device, or may be a PE device. The second network device may be an SPE device or may be an NPE device. The third network device may be an SPE device, or may be an NPE device.

FIG. 3 is a flowchart of a method for deferring a switchback according to an embodiment of the present disclosure. The method includes the following steps.

Step 301: A second network device receives a query packet sent by a first network device, where the second network device is a primary network device.

After troubleshooting, the second network device establishes a communication connection to the first network device. Before a primary route between the first network device and the second network device takes effect, the first network device sends the query packet to the second network device. The query packet triggers the second network device to detect whether a route from the second network device to a destination device is available.

Two conditions need to be satisfied after the route between the first network device and the second network device takes effect. A first condition is that a forwarding entry is generated at a forwarding layer of the first network device. A second condition is that the forwarding entry is activated. A switchback from a secondary route to the primary route can be performed only when the two conditions are satisfied and the primary route between the first network device and the second network device takes effect. The first network device may defer the switchback in two different phases before the primary route takes effect. For a specific implementation process, refer to the detailed description in the method for deferring a switchback according to the embodiment of the present disclosure shown in FIG. 1. Details are not described again herein.

Step 302: The second network device detects, according to the query packet, whether a route from the second network device to a destination device is available.

The query packet received by the second network device carries an IP address of the destination device. The second network device queries whether the route to the destination device identified by the IP address carried in the query packet is available. When the route from the second network device to the destination device is available, it indicates that the first network device can transmit service data to the destination device using a route whose next hop is the second network device. When the route from the second network device to the destination device is unavailable, it indicates that the first network device cannot transmit service data to the destination device using the route whose next hop is the second network device.

In an application scenario of an IP bearer network, there are at least two possible implementation manners for the second device to detect, according to the query packet, whether the route from the second network device to the destination device is available.

A first possible implementation manner includes that the second network device queries whether a backup of an ARP table from a third network device is completed, and the second network device queries whether an ARP entry corresponding to the IP address of the destination device exists in the backup ARP table when the second network device completes the backup of the ARP table from the third network device.

In the first possible implementation manner, after troubleshooting and restart of the second network device, if an ARP hot backup is configured in the second network device, the ARP table may be backed up from the third network device. After the second network device completes the backup of the ARP table from the third network device, the second network device queries whether the ARP entry corresponding to the IP address of the destination device exists in the backup ARP table. If the ARP entry corresponding to the IP address of the destination device exists, it indicates that the route from the second network device to the destination device is available. If the ARP entry corresponding to the IP address of the destination device does not exist, it indicates that the route from the second network device to the destination device is unavailable. The second network device is the primary network device. The third network device is a secondary network device for the second network device.

A second possible implementation manner includes that the second network device generates an ARP table using a preset ARP configuration file, and the second network device queries whether an ARP entry corresponding to the IP address of the destination device exists in the ARP table.

In the second possible implementation manner, after troubleshooting and restart of the second network device, if no ARP hot backup is configured in the second network device, the second network device generates the ARP table using the preset ARP configuration file, and queries whether the ARP entry corresponding to the IP address of the destination device exists in the generated ARP table. If the ARP entry corresponding to the IP address of the destination device exists, it indicates that the route from the second network device to the destination device is available. If the ARP entry corresponding to the IP address of the destination device does not exist, it indicates that the route from the second network device to the destination device is unavailable.

In an application scenario of an MPLS L3VPN, there are at least four possible implementation manners for the second device to detect, according to the query packet, whether the route from the second network device to the destination device is available.

A first possible implementation manner includes that the second network device queries whether a backup of an ARP table from the third network device is completed. The second network device queries whether an ARP entry corresponding to the IP address of the destination device exists in the backup ARP table when the second network device completes the backup of the ARP table from the third network device, and the second network device detects whether a PW from the second network device to a fourth network device is available when the ARP entry corresponding to the IP address of the destination device exists, where the fourth network device is connected to the destination device.

A second possible implementation manner includes that the second network device generates an ARP table using a preset ARP configuration file. The second network device queries whether an ARP entry corresponding to the IP address of the destination device exists in the ARP table, and the second network device detects whether a PW from the second network device to a fourth network device is available when the ARP entry corresponding to the IP address of the destination device exists, where the fourth network device is connected to the destination device.

In the first possible implementation manner and the second possible implementation manner, when the ARP entry corresponding to the IP address of the destination device exists in the backup or generated ARP table, the second network device detects whether the PW from the second network device to the fourth network device is available. When the PW from the second network device to the fourth network device is available, it indicates that the route from the second network device to the destination device is available. The fourth network device is connected to the destination device. The fourth network device may be directly connected to the destination device, or may be indirectly connected to the destination device using a switch.

A third possible implementation manner includes that the second network device queries whether a backup of an ARP table from the third network device is completed. The second network device queries whether an ARP entry corresponding to the IP address of the destination device exists in the backup ARP table when the second network device completes the backup of the ARP table from the third network device, and the second network device detects whether a protection PW from the second network device to the third network device is available when the ARP entry corresponding to the IP address of the destination device exists, where the protection PW is an ICB PW or a DNI PW.

A fourth possible implementation manner includes that the second network device generates an ARP table using a preset ARP configuration file. The second network device queries whether an ARP entry corresponding to the IP address of the destination device exists in the ARP table, and the second network device detects whether a protection PW from the second network device to the third network device is available when the ARP entry corresponding to the IP address of the destination device exists, where the protection PW is an ICB PW or a DNI PW.

In the third possible implementation manner and the fourth possible implementation manner, when the ARP entry corresponding to the IP address of the destination device exists in the backup or generated ARP table, the second network device detects whether the ICB PW or the DNI PW from the second network device to the third network device is available. When the ICB PW or the DNI PW from the second network device to the third network device is available, it indicates that the route from the second network device to the destination device is available.

The following describes the application scenario of the MPLS L3VPN using an example with reference to FIG. 1.

In FIG. 1, a device 101 and a device 102 are UPE devices, a base station A is connected to the device 101, and a base station B is connected to the device 102. A device 103 and a device 104 are SPE devices, the device 103 is a primary SPE device, and the device 104 is a secondary SPE device. A device 105 and a device 106 are NPE devices. If the device 103 is faulty, the device 105 forwards, to the device 104, service data to be transmitted to the base station A, the device 104 routes the service data received from the device 105 to the device 102, the device 102 sends the service data to the device 101, and the device 101 forwards the service data to the base station A. After troubleshooting and restart, the device 103 establishes a communication connection to the device 105. The device 105 sends a query packet to the device 103. After receiving the query packet, the device 103 detects whether a route between the device 103 and the base station A is available.

The device 103 detects whether the route between the device 103 and the base station A is available. First, the device 103 queries whether an ARP entry corresponding to an IP address of the destination device exists. The device 103 may perform a query in an ARP table backed up from the device 104, or the device 103 may perform a query in an ARP table generated according to a preset ARP configuration file. When the ARP entry corresponding to the IP address of the destination device exists, the device 103 detects whether a PW between the device 103 and the device 101 is available, and when the PW between the device 103 and the device 101 is available, it indicates that the route from the device 103 to the base station A is available. Alternatively, the device 103 detects whether a protection PW between the device 103 and the device 104 is available, and when the protection PW between the device 103 and the device 104 is available, it indicates that the route from the device 103 to the base station A is available. When the route from the device 103 to the base station A is available, it indicates that the device 105 can transmit service data to the base station A using a route whose next hop is the device 103.

Step 303: When the route from the second network device to the destination device is available, the second network device sends a query response packet to the first network device, where the query response packet triggers the first network device to switch back from a secondary route to a primary route.

A destination address of the secondary route is the IP address of the destination device, and a next hop of the secondary route is the third network device. A destination address of the primary route is the IP address of the destination device, and a next hop of the primary route is the second network device. The third network device is the secondary network device for the second network device.

When the route from the second network device to the destination device is available, the second network device sends the query response packet to the first network device, indicating that the first network device can transmit service data to the destination device using a route whose next hop is the second network device. After receiving the query response packet, the first network device switches from the secondary route to the primary route. The first network device transmits, to the second network device, the service data to be transmitted to the destination device.

Herein it should be noted that, in an actual application scenario, the first network device is an NPE device or a PE device. The second network device and the third network device are SPE devices or NPE devices. The fourth network device is a UPE device.

A specific implementation manner of switching from the secondary route to the primary route by the first network device is similar to the method provided by the embodiment shown in FIG. 1. Refer to the description of the embodiment shown in FIG. 1. Details are not described again herein.

Figure 4:
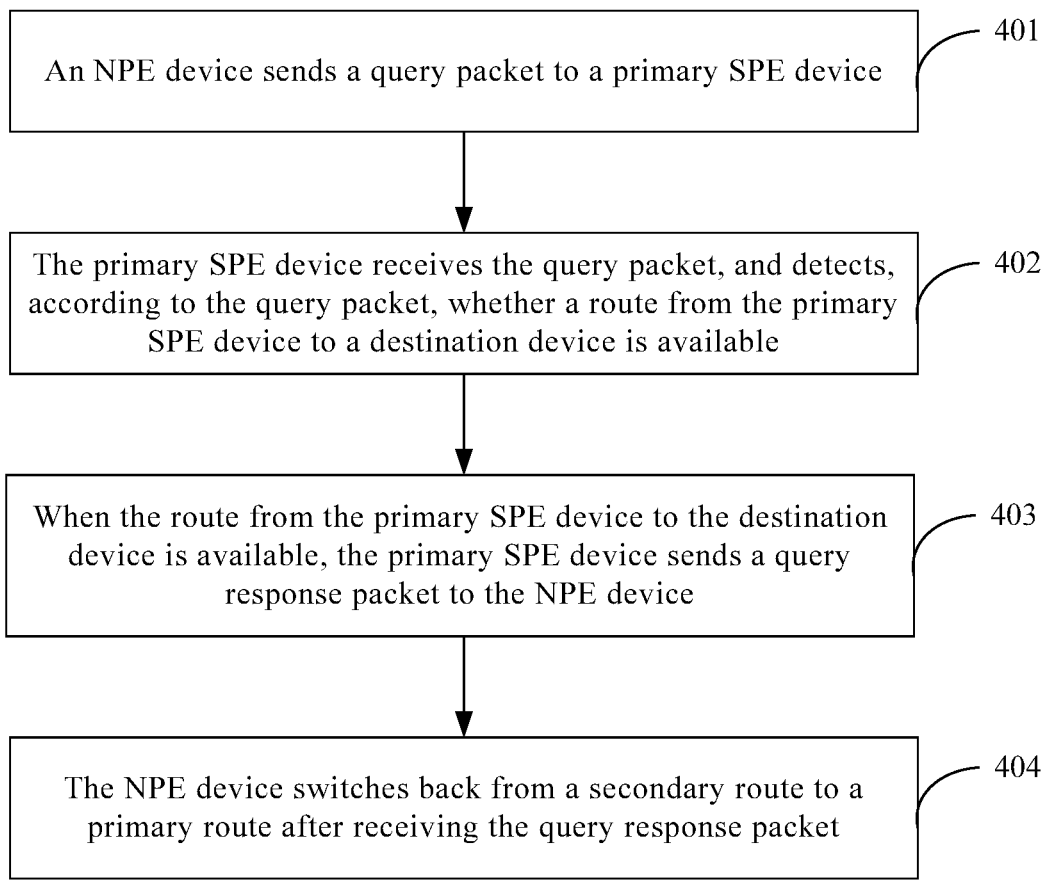
FIG. 4 is a flowchart of a method for deferring a switchback in a VPN FRR scenario according to an embodiment of the present disclosure.

FIG. 4 is a flowchart of a method for deferring a switchback in a VPN FRR scenario according to an embodiment of the present disclosure. The method includes the following steps.

Step 401: An NPE device sends a query packet to a primary SPE device.

In an embodiment, that an NPE device sends a query packet to a primary SPE device further includes the NPE device restores a TE tunnel connection to the primary SPE device after troubleshooting the primary SPE device.

The NPE device may send the query packet to the primary SPE device when deferring a switchback after restoring the TE tunnel connection to the primary SPE device.

In another embodiment, that an NPE device sends a query packet to a primary SPE device further includes the NPE device restores a TE tunnel connection to the primary SPE device after troubleshooting the primary SPE device, and the NPE device generates a forwarding entry of a primary route.

The NPE device may send the query packet to the primary SPE device when deferring a switchback after restoring the TE tunnel connection to the primary SPE device and generating the forwarding entry of the primary route between the NPE device and the primary SPE device.

Step 402: The primary SPE device receives the query packet, and detects, according to the query packet, whether a route from the primary SPE device to a destination device is available.

In an embodiment, that the primary SPE device detects, according to the query packet, whether a route from the primary SPE device to a destination device is available, includes the primary SPE device queries whether a backup of an ARP table from a secondary SPE device is completed, and when the primary SPE device completes the backup of the ARP table from the secondary SPE device, the primary SPE device queries whether an ARP entry corresponding to an IP address of the destination device exists in the backup ARP table, or the primary SPE device generates an ARP table using a preset ARP configuration file, and the primary SPE device queries whether an ARP entry corresponding to an IP address of the destination device exists in the ARP table, and when the ARP entry corresponding to the IP address of the destination device exists, the primary SPE device detects whether a PW from the primary SPE device to a UPE device connected to the destination device is available.

When the PW from the primary SPE device to the UPE device connected to the destination device is available, it indicates that the route from the primary SPE device to the destination device is available.

In another embodiment, that the primary SPE device detects, according to the query packet, whether a route from the primary SPE device to a destination device is available, includes that the primary SPE device queries whether a backup of an ARP table from the secondary SPE device is completed, and when the primary SPE device completes the backup of the ARP table from the secondary SPE device, the primary SPE device queries whether an ARP entry corresponding to an IP address of the destination device exists in the backup ARP table, or the primary SPE device generates an ARP table using a preset ARP configuration file, and the primary SPE device queries whether an ARP entry corresponding to an IP address of the destination device exists in the ARP table, and when the ARP entry corresponding to the IP address of the destination device exists, the primary SPE device detects whether a DNI PW from the primary SPE device to the secondary SPE device is available.

When the DNI PW from the primary SPE device to the secondary SPE device is available, it indicates that the route from the primary SPE device to the destination device is available.

Step 403: When the route from the primary SPE device to the destination device is available, the primary SPE device sends a query response packet to the NPE device.

Step 404: The NPE device switches back from a secondary route to a primary route after receiving the query response packet.

A destination address of the secondary route is the IP address of the destination device, and a next hop of the secondary route is the secondary SPE device. A destination address of the primary route is the IP address of the destination device, and a next hop of the primary route is the primary SPE device.

The method for deferring a switchback as shown in FIG. 4 is described using an example in which a first network device is an NPE device, a second network device is a primary SPE device, a third network device is a secondary SPE device, and a fourth network device is a UPE device. For a specific implementation manner, refer to the method for deferring a switchback as shown in FIG. 2 and FIG. 3. Details are not described again herein.

As can be known from the foregoing content, the present disclosure has the following advantageous effects.

A first network device is triggered to switch back from a secondary route to a primary route only when a second network device detects availability of a route to a destination device, thereby reducing a wait-to-restore time of a switchback. In addition, when the route from the second network device to the destination device is available, the first network device switches back from the secondary route to the primary route, thereby ensuring that service data transmitted from the first network device to the second network device can be transmitted to the destination device, and implementing smooth transmission of the service data.

Figure 5:
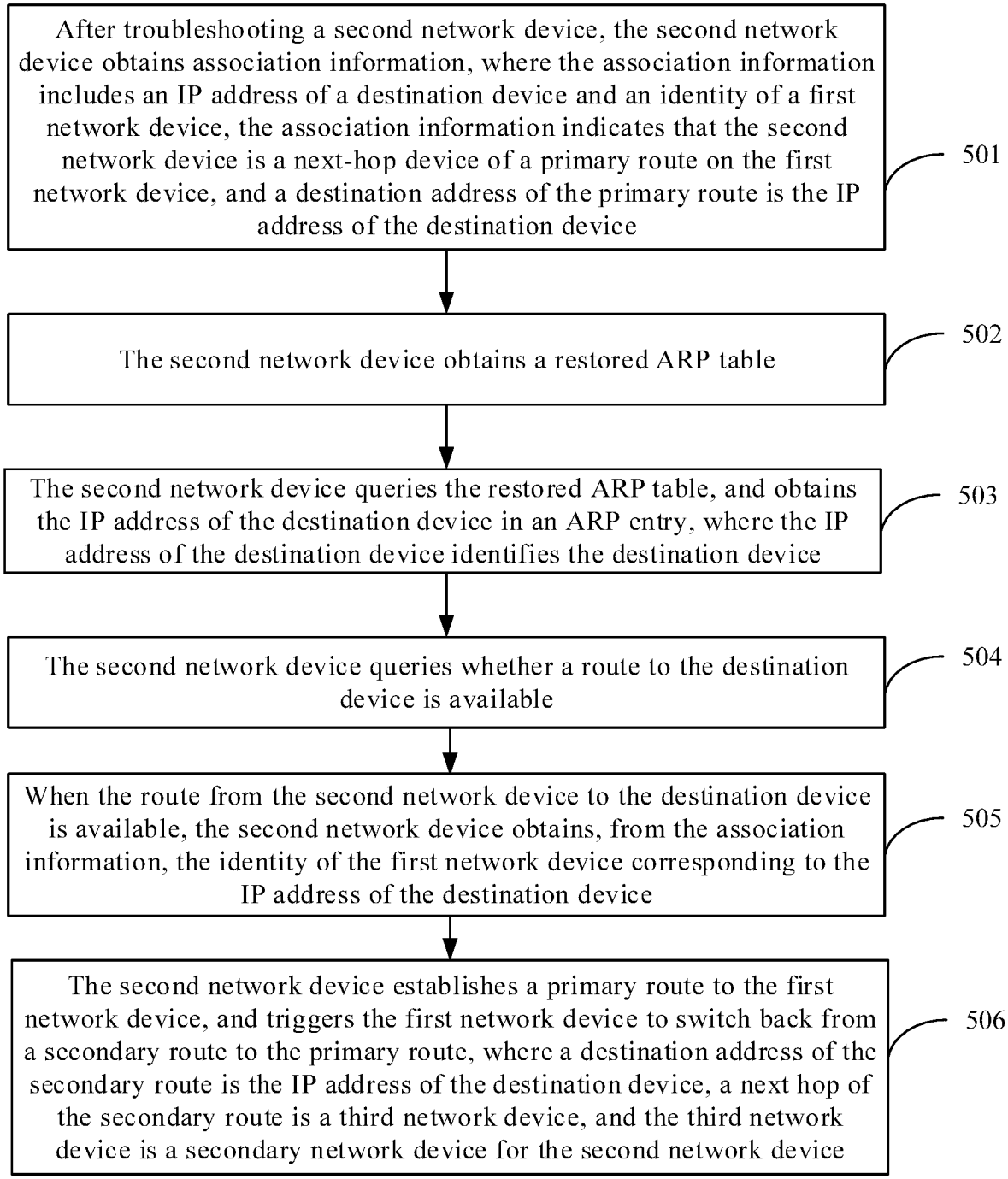
FIG. 5 is a flowchart of a method for deferring a switchback according to an embodiment of the present disclosure.

FIG. 5 is a flowchart of a method for deferring a switchback according to an embodiment of the present disclosure. The method includes the following steps.

Step 501: After troubleshooting a second network device, the second network device obtains association information, where the association information includes an IP address of a destination device and an identity of a first network device, the association information indicates that the second network device is a next-hop device of a primary route on the first network device, and a destination address of the primary route is the IP address of the destination device.

The association information obtained by the second network device includes the IP address of the destination device and the identity of the first network device. The IP address of the destination device is the destination address of the primary route on the first network device, and the next-hop device of the primary route is the second network device.

In actual application, the association relationship obtained by the second network device further includes a TE tunnel from the first network device to the second network device, and a PW and a protection PW corresponding to the primary route on the first network device.

Herein it should be noted that, the primary route is a route from the first network device to the second network device, that is, in the association information obtained by the second network device, a route from a first network device indicated by each first network device identity to the second network device may be referred to as a primary route.

The association information obtained by the second network device may be generated by the second network device according to configurations of a person skilled in the art, or may be obtained from other network devices, and may be set freely according to an actual requirement.

Step 502: The second network device obtains a restored ARP table.

The second network device obtains a restored ARP table includes that the second network device backs up an ARP table from the third network device, and sets the backup ARP table as the restored ARP table, or the second network device generates an ARP table using a preset ARP configuration file, and sets the generated ARP table as the restored ARP table.

If an ARP hot backup is configured in the second network device, the ARP table may be backed up from the third network device. After the second network device completes the backup of the ARP table from the third network device, the second network device sets the backup ARP table as the restored ARP table. If no ARP hot backup is configured in the second network device, the second network device generates the ARP table using the preset ARP configuration file, and sets the generated ARP table as the restored ARP table.

Step 503: The second network device queries the restored ARP table, and obtains the IP address of the destination device in an ARP entry, where the IP address of the destination device identifies the destination device.

Step 504: The second network device queries whether a route to the destination device is available.

The IP address of the destination device exists in the restored ARP table, and identifies the destination device corresponding to the ARP entry. The second network device queries whether the route from the second network device to the destination device identified by the IP address of the destination device in the restored ARP entry is available.

In an embodiment, the second network device queries whether a route to the destination device is available includes that the second network device detects whether a PW from a primary SPE device to a fourth network device is available, where the fourth network device is connected to the destination device.

In another embodiment, that the second network device queries whether a route to the destination device is available includes the second network device detects whether a protection PW from the second network device to the third network device is available, where the protection PW is an ICB PW or a DNI PW.

The second network device obtains the restored ARP entry, obtains the IP address of the destination device that is stored in the ARP entry, and sets either of the foregoing two methods to detect whether the route from the second network device to the destination device identified by the IP address of the destination device is available.

This is similar to the method for deferring a switchback as shown in FIG. 2. Refer to the method for deferring a switchback as shown in FIG. 2. Details are not described again herein.

Step 505: When the route from the second network device to the destination device is available, the second network device obtains, from the association information, the identity of the first network device corresponding to the IP address of the destination device.

Step 506: The second network device establishes a primary route to the first network device, and triggers the first network device to switch back from a secondary route to the primary route, where a destination address of the secondary route is the IP address of the destination device, a next hop of the secondary route is a third network device, and the third network device is a secondary network device for the second network device.

When the route from the second network device to the destination device is available, the second network device obtains, from the association information, the identity of the first network device corresponding to the IP address of the destination device. That is, if the route from the second network device to the destination device is available, it indicates that service data may be transmitted to the destination device through the second network device. Therefore, the primary route from the first network device to the second network device may be established, and the primary route sets the IP address of the destination device as the destination address. After the primary route from the first network device to the second network device is established, the first network device switches back from the secondary route to the primary route immediately.

When the route from the second network device to the destination device is available, the second network device establishes a communication connection to the first network device, thereby triggering the first network device to switch back from the primary route to the secondary route. The first network device is an NPE device or a PE device. The second network device and the third network device are SPE devices or NPE devices, and the fourth network device is a UPE device.

In an application scenario of an IP bearer network, the first network device switches back from the primary route to the secondary route includes that the first network device creates a forwarding entry of the primary route, and activates the forwarding entry, and the first network device forwards a data packet to the second network device using the forwarding entry.

In an application scenario of an MPLS L3VPN, the first network device switches back from the primary route to the secondary route includes that the first network device restores a TE tunnel connection to the second network device. The first network device creates a forwarding entry of the primary route, and activates the forwarding entry, and the first network device forwards a data packet to the second network device using the forwarding entry.

Activating the forwarding entry is setting the forwarding entry as primary.

In this embodiment, after troubleshooting a second network device, the second network device does not establish a communication connection to a first network device immediately, but queries whether a route from the second network device to a destination device identified by an IP address of the destination device stored in a restored ARP entry is available. Therefore, the first network device cannot perform a switchback from a secondary route to a primary route, and the switchback is deferred.

Figure 6:
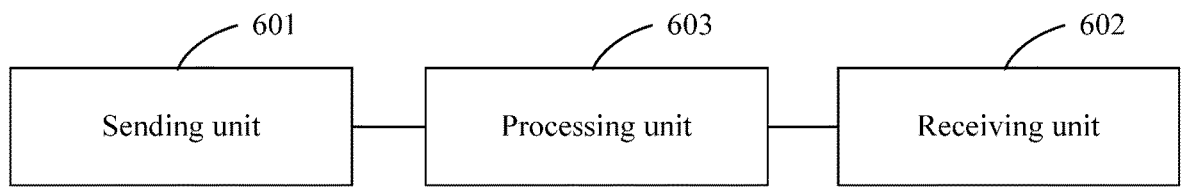
FIG. 6 is a schematic structural diagram of a first network device for deferring a switchback according to an embodiment of the present disclosure.

FIG. 6 is a schematic structural diagram of a first network device for deferring a switchback according to an embodiment of the present disclosure. The first network device includes a sending unit 601 configured to send a query packet to a second network device, where the query packet triggers the second network device to detect whether a route from the second network device to a destination device is available, and the second network device is a primary network device, a receiving unit 602 configured to receive a query response packet sent by the second network device, and send the query response packet to a processing unit 603, and the processing unit 603 configured to generate the query packet, and send the query packet to the sending unit 601, and after the receiving unit 602 receives the query response packet sent by the second network device, switch back from a secondary route to a primary route, where the query response packet indicates availability of the route between the second network device and the destination device, a destination address of the secondary route is an IP address of the destination device, a next hop of the secondary route is a third network device, a destination address of the primary route is the IP address of the destination device, a next hop of the primary route is the second network device, and the third network device is a secondary network device for the second network device.

In a first application scenario of an IP bearer network, the processing unit 603 is configured to send the query packet to the second network device immediately after troubleshooting the second network device and after a communication connection is established to the second network device.

In a second application scenario of the IP bearer network, the processing unit 603 is further configured to generate a forwarding entry of the primary route after troubleshooting the second network device and before the query packet is sent to the second network device.

In a first application scenario of an MPLS L3VPN, the processing unit 603 is further configured to restore, a TE tunnel connection to the second network device after troubleshooting the second network device and before the query packet is sent to the second network device.

That the processing unit 603 is configured to switch from a secondary route to a primary route includes creating a forwarding entry of the primary route, activating the forwarding entry, and forwarding a data packet to the second network device using the forwarding entry.

In a second application scenario of the MPLS L3VPN, the processing unit 603 is further configured to restore, by the first network device, a TE tunnel connection to the second network device after troubleshooting the second network device and before the query packet is sent to the second network device, and generate a forwarding entry of the primary route.

That the processing unit 603 is configured to switch from a secondary route to a primary route includes activating the forwarding entry, and forwarding a data packet to the second network device using the forwarding entry.

The first network device is an NPE device or a PE device, and the second network device and the third network device are SPE devices or NPE devices.

The first network device shown in FIG. 6 is a device corresponding to the method shown in FIG. 2, and is similar to the implementation method in FIG. 2. Refer to the description of the implementation method shown in FIG. 2. Details are not described again herein.

Figure 7:
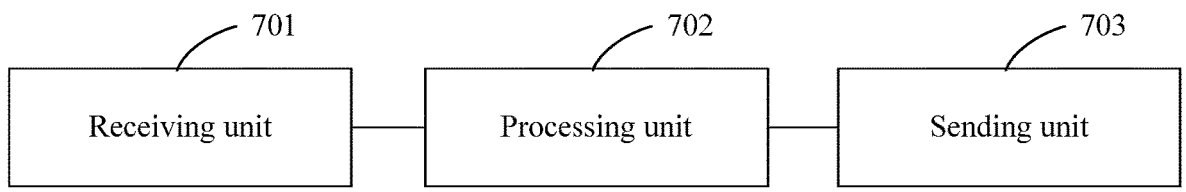
FIG. 7 is a schematic structural diagram of a second network device for deferring a switchback according to an embodiment of the present disclosure.

FIG. 7 is a schematic structural diagram of a second network device for deferring a switchback according to an embodiment of the present disclosure. The second network device includes a receiving unit 701 configured to receive a query packet sent by a first network device, and send the query packet to a processing unit 702, where the second network device is a primary network device. The processing unit 702 configured to detect, according to the query packet, whether a route from the second network device to a destination device is available, and a sending unit 703 configured to send a query response packet to the first network device when the route from the second network device to the destination device is available, where the query response packet triggers the first network device to switch back from a secondary route to a primary route, a destination address of the secondary route is an IP address of the destination device, a next hop of the secondary route is a third network device, a destination address of the primary route is the IP address of the destination device, a next hop of the primary route is the second network device, and the third network device is a secondary network device for the second network device.

In a first application scenario of an IP bearer network, that the processing unit 702 is configured to detect, according to the query packet, whether a route from the second network device to a destination device is available, includes the second network device queries whether a backup of an ARP table from the third network device is completed, and the second network device queries whether an ARP entry corresponding to the IP address of the destination device exists in the backup ARP table when the second network device completes the backup of the ARP table from the third network device.

In a second application scenario of the IP bearer network, that the processing unit 702 is configured to detect, according to the query packet, whether a route from the second network device to a destination device is available, includes the second network device generates an ARP table using a preset ARP configuration file, and the second network device queries whether an ARP entry corresponding to the IP address of the destination device exists in the ARP table.

In a first application scenario of an MPLS L3VPN, that the processing unit 702 is configured to detect, according to the query packet, whether a route from the second network device to a destination device is available, includes querying whether a backup of an ARP table from the third network device is completed, and querying whether an ARP entry corresponding to the IP address of the destination device exists in the backup ARP table when the second network device completes the backup of the ARP table from the third network device, or generating an ARP table using a preset ARP configuration file, and querying whether an ARP entry corresponding to the IP address of the destination device exists in the ARP table, and detecting, whether a PW from the second network device to a fourth network device is available when the ARP entry corresponding to the IP address of the destination device exists, where the fourth network device is connected to the destination device.

In a second application scenario of the MPLS L3VPN, that the processing unit 702 is configured to detect, according to the query packet, whether a route from the second network device to a destination device is available, includes querying whether a backup of an ARP table from the third network device is completed, and querying whether an ARP entry corresponding to the IP address of the destination device exists in the backup ARP table when the second network device completes the backup of the ARP table from the third network device, or generating an ARP table using a preset ARP configuration file, and querying whether an ARP entry corresponding to the IP address of the destination device exists in the ARP table, and detecting, whether a protection PW from the second network device to the third network device is available when the ARP entry corresponding to the IP address of the destination device exists, where the protection PW is an ICB PW or a DNI PW.

The second network device shown in FIG. 7 is a device corresponding to the method shown in FIG. 3, and is similar to the implementation method in FIG. 3. Refer to the description of the implementation method shown in FIG. 3. Details are not described again herein.

The first network device is an NPE device or a PE device. The second network device and the third network device are SPE devices or NPE devices, and the fourth network device is a UPE device.

Figure 8:
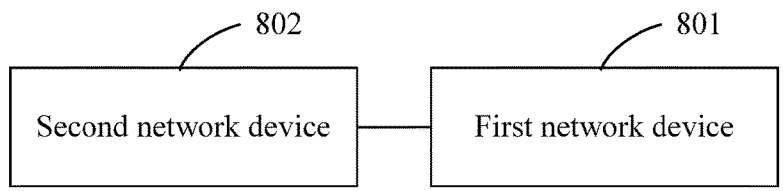
FIG. 8 is a schematic structural diagram of a system for deferring a switchback according to an embodiment of the present disclosure.

FIG. 8 is a schematic structural diagram of a system for deferring a switchback according to an embodiment of the present disclosure. The system includes the first network device 801 for deferring a switchback as shown in FIG. 6 and the second network device 802 for deferring a switchback as shown in FIG. 7.

The system shown in FIG. 8 includes the first network device 801 shown in FIG. 6 and the second network device 802 for deferring a switchback as shown in FIG. 7. For a specific implementation structure, refer to the description of the structure of the first network device shown in FIG. 6 and the description of the structure of the second network device shown in FIG. 7. Details are not described again herein.

Figure 9:
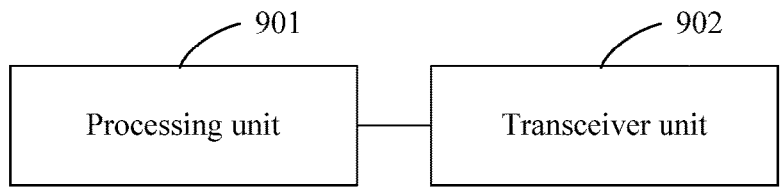
FIG. 9 is a schematic structural diagram of a second network device for deferring a switchback according to an embodiment of the present disclosure.

FIG. 9 is a schematic structural diagram of a second network device for deferring a switchback according to an embodiment of the present disclosure. The second network device includes a processing unit 901 configured to obtain association information after troubleshooting, where the association information includes an IP address of a destination device and an identity of a first network device, the association information indicates that the second network device is a next-hop device of a primary route on the first network device, and a destination address of the primary route is the IP address of the destination device, obtain a restored ARP table, query the restored ARP table, and obtain the IP address of the destination device in an ARP entry, where the IP address of the destination device identifies the destination device, query whether a route to the destination device is available, obtain, from the association information, the identity of the first network device corresponding to the IP address of the destination device when the route from the second network device to the destination device is available, establish a primary route to the first network device, and trigger the first network device to switch back from a secondary route to the primary route, where a destination address of the secondary route is the IP address of the destination device, a next hop of the secondary route is a third network device, and the third network device is a secondary network device for the second network device, and a transceiver unit 902 configured to receive and send data information for establishing the primary route to the first network device.

The processing unit 901 is configured to obtain a restored ARP table includes that the second network device backs up an ARP table from the third network device, and sets the backup ARP table as the restored ARP table, or the second network device generates an ARP table using a preset ARP configuration file, and sets the generated ARP table as the restored ARP table.

The processing unit 901 queries whether a route to the destination device is available includes the second network device detects whether a PW from a primary SPE device to a fourth network device is available, where the fourth network device is connected to the destination device.

The processing unit 901 queries whether a route to the destination device is available includes that the second network device detects whether a protection PW from the second network device to the third network device is available, where the protection PW is an ICB PW or a DNI PW.

The first network device is an NPE device or a PE device. The second network device and the third network device are SPE devices or NPE devices, and the fourth network device is a UPE device.

The second network device shown in FIG. 9 is a device corresponding to the method shown in FIG. 5, and is similar to the implementation method in FIG. 5. Refer to the description of the implementation method shown in FIG. 5. Details are not described again herein.

Figure 10:
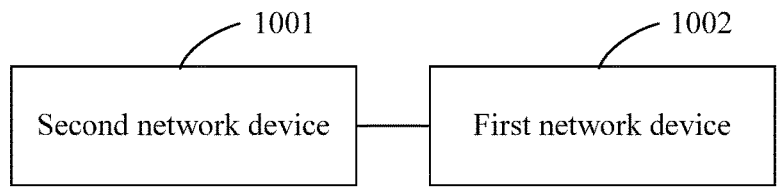
FIG. 10 is a schematic structural diagram of a system for deferring a switchback according to an embodiment of the present disclosure.

FIG. 10 is a schematic structural diagram of a system for deferring a switchback according to an embodiment of the present disclosure. The system includes the second network device 1001 for deferring a switchback according to the embodiment of the present disclosure shown in FIG. 9 and a first network device 1002.

The first network device 1002 is configured to switch back from a secondary route to a primary route after establishing the primary route to the second network device 1001, where a destination address of the secondary route is an IP address of the destination device, a next hop of the secondary route is a third network device, a destination address of the primary route is the IP address of the destination device, a next hop of the primary route is the second network device 1001, and the third network device is a secondary network device for the second network device 1001.

The structure of the second network device for deferring a switchback according to the embodiment of the present disclosure shown in FIG. 10 is similar to the structure of the second network device shown in FIG. 9. Refer to the description of the structure of the second network device shown in FIG. 9. Details are not described again herein.

Figure 11:
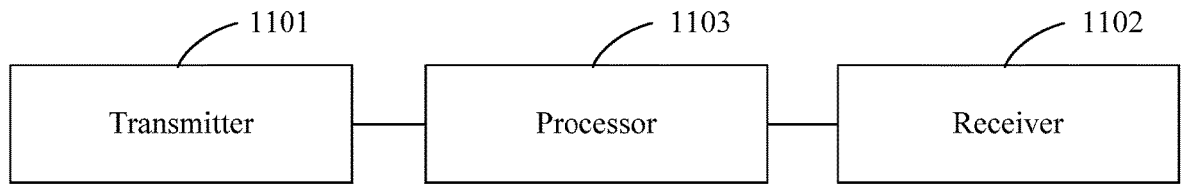
FIG. 11 is a schematic structural diagram of a first network device for deferring a switchback according to an embodiment of the present disclosure.

FIG. 11 is a schematic structural diagram of a first network device for deferring a switchback according to an embodiment of the present disclosure. The first network device includes a transmitter 1101 configured to send a query packet to a second network device, where the query packet triggers the second network device to detect whether a route from the second network device to a destination device is available, and the second network device is a primary network device, a receiver 1102 configured to receive a query response packet sent by the second network device, and send the query response packet to a processor 1103, and the processor 1103 configured to generate the query packet, and send the query packet to the transmitter 1101, and after the receiver 1102 receives the query response packet sent by the second network device, switch back from a secondary route to a primary route, where the query response packet indicates availability of the route between the second network device and the destination device, a destination address of the secondary route is an IP address of the destination device, a next hop of the secondary route is a third network device, a destination address of the primary route is the IP address of the destination device, a next hop of the primary route is the second network device, and the third network device is a secondary network device for the second network device.

In a first application scenario of an IP bearer network, the processor 1103 is configured to send the query packet to the second network device immediately after troubleshooting the second network device and after a communication connection is established to the second network device.

In a second application scenario of the IP bearer network, the processor 1103 is further configured to generate a forwarding entry of the primary route after troubleshooting the second network device and before the query packet is sent to the second network device.

In a first application scenario of an MPLS L3VPN, the processor 1103 is further configured to restore, a TE tunnel connection to the second network device after troubleshooting the second network device and before the query packet is sent to the second network device.

The processor 1103 is configured to switch from a secondary route to a primary route includes creating a forwarding entry of the primary route, activating the forwarding entry, and forwarding a data packet to the second network device using the forwarding entry.

In a second application scenario of the MPLS L3VPN, the processor 1103 is further configured to restore, by the first network device, a TE tunnel connection to the second network device, and generate a forwarding entry of the primary route after troubleshooting the second network device and before the query packet is sent to the second network device.

The processor 1103 is configured to switch from a secondary route to a primary route includes activating the forwarding entry, and forwarding a data packet to the second network device using the forwarding entry.

The first network device is an NPE device or a PE device, and the second network device and the third network device are SPE devices or NPE devices.

The first network device shown in FIG. 11 is a device corresponding to the method shown in FIG. 2, and is similar to the implementation method in FIG. 2. Refer to the description of the implementation method shown in FIG. 2. Details are not described again herein.

Figure 12:
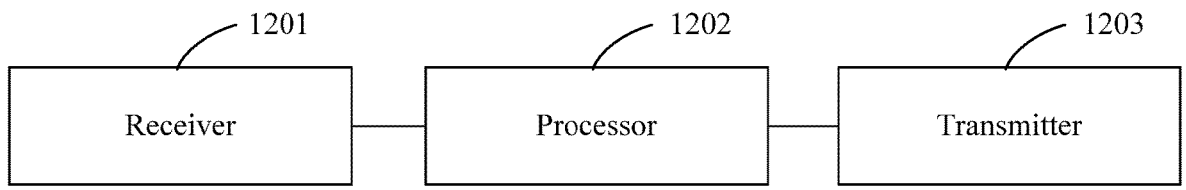
FIG. 12 is a schematic structural diagram of a second network device for deferring a switchback according to an embodiment of the present disclosure.

FIG. 12 is a schematic structural diagram of a second network device for deferring a switchback according to an embodiment of the present disclosure. The second network device includes a receiver 1201 configured to receive a query packet sent by a first network device, and send the query packet to a processor 1202, where the second network device is a primary network device. The processor 1202 configured to detect, according to the query packet, whether a route from the second network device to a destination device is available, and a transmitter 1203 configured to send a query response packet to the first network device when the route from the second network device to the destination device is available, where the query response packet triggers the first network device to switch back from a secondary route to a primary route, a destination address of the secondary route is an IP address of the destination device, a next hop of the secondary route is a third network device, a destination address of the primary route is the IP address of the destination device, a next hop of the primary route is the second network device, and the third network device is a secondary network device for the second network device.

In a first application scenario of an IP bearer network, the processor 1202 is configured to detect, according to the query packet, whether a route from the second network device to a destination device is available, includes that the second network device queries whether a backup of an ARP table from the third network device is completed, and the second network device queries whether an ARP entry corresponding to the IP address of the destination device exists in the backup ARP table when the second network device completes the backup of the ARP table from the third network device.

In a second application scenario of the IP bearer network, the processor 1202 is configured to detect, according to the query packet, whether a route from the second network device to a destination device is available, includes the second network device generates an ARP table using a preset ARP configuration file, and the second network device queries whether an ARP entry corresponding to the IP address of the destination device exists in the ARP table.

In a first application scenario of an MPLS L3VPN, the processor 1202 is configured to detect, according to the query packet, whether a route from the second network device to a destination device is available, includes querying whether a backup of an ARP table from the third network device is completed, and querying whether an ARP entry corresponding to the IP address of the destination device exists in the backup ARP table when the second network device completes the backup of the ARP table from the third network device, or generating an ARP table using a preset ARP configuration file, and querying whether an ARP entry corresponding to the IP address of the destination device exists in the ARP table, and detecting, whether a PW from the second network device to a fourth network device is available when the ARP entry corresponding to the IP address of the destination device exists, where the fourth network device is connected to the destination device.

In a second application scenario of the MPLS L3VPN, the processor 1202 is configured to detect, according to the query packet, whether a route from the second network device to a destination device is available, includes querying whether a backup of an ARP table from the third network device is completed, and querying whether an ARP entry corresponding to the IP address of the destination device exists in the backup ARP table when the second network device completes the backup of the ARP table from the third network device, or generating an ARP table using a preset ARP configuration file, and querying whether an ARP entry corresponding to the IP address of the destination device exists in the ARP table, and detecting, whether a protection PW from the second network device to the third network device is available when the ARP entry corresponding to the IP address of the destination device exists, where the protection PW is an ICB PW or a DNI PW.

The second network device shown in FIG. 12 is a device corresponding to the method shown in FIG. 3, and is similar to the implementation method in FIG. 3. Refer to the description of the implementation method shown in FIG. 3. Details are not described again herein.

The first network device is an NPE device or a PE device. The second network device and the third network device are SPE devices or NPE devices, and the fourth network device is a UPE device.

Figure 13:
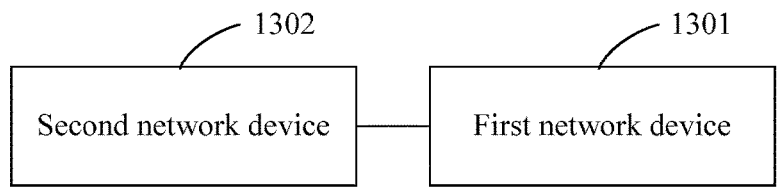
FIG. 13 is a schematic structural diagram of a system for deferring a switchback according to an embodiment of the present disclosure.

FIG. 13 is a schematic structural diagram of a system for deferring a switchback according to an embodiment of the present disclosure. The system includes the first network device 1301 for deferring a switchback as shown in FIG. 11 and the second network device 1302 for deferring a switchback as shown in FIG. 12.

The system shown in FIG. 13 includes the first network device 1301 shown in FIG. 11 and the second network device 1302 for deferring a switchback as shown in FIG. 12. For a specific implementation structure, refer to the description of the structure of the first network device shown in FIG. 11 and the description of the structure of the second network device shown in FIG. 12. Details are not described again herein.

Figure 14:
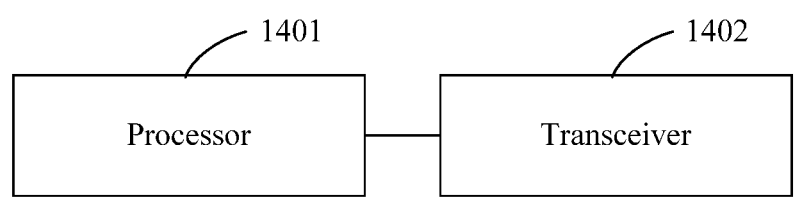
FIG. 14 is a schematic structural diagram of a second network device for deferring a switchback according to an embodiment of the present disclosure.

FIG. 14 is a schematic structural diagram of a second network device for deferring a switchback according to an embodiment of the present disclosure. The second network device includes a processor 1401 configured to obtain association information after troubleshooting, where the association information includes an IP address of a destination device and an identity of a first network device, the association information indicates that the second network device is a next-hop device of a primary route on the first network device, and a destination address of the primary route is the IP address of the destination device, obtain a restored ARP table, query the restored ARP table, and obtain the IP address of the destination device in an ARP entry, where the IP address of the destination device identifies the destination device, query whether a route to the destination device is available, obtain, from the association information, the identity of the first network device corresponding to the IP address of the destination device when the route from the second network device to the destination device is available, establish a primary route to the first network device, and trigger the first network device to switch back from a secondary route to the primary route, where a destination address of the secondary route is the IP address of the destination device, a next hop of the secondary route is a third network device, and the third network device is a secondary network device for the second network device, and a transceiver 1402 configured to send data information for establishing the primary route to the first network device.

The processor 1401 is configured to obtain a restored ARP table includes that the second network device backs up an ARP table from the third network device, and sets the backup ARP table as the restored ARP table, or the second network device generates an ARP table using a preset ARP configuration file, and sets the generated ARP table as the restored ARP table.

The processor 1401 queries whether a route to the destination device is available includes the second network device detects whether a PW from a primary SPE device to a fourth network device is available, where the fourth network device is connected to the destination device.

The processor 1401 queries whether a route to the destination device is available includes that the second network device detects whether a protection PW from the second network device to the third network device is available, where the protection PW is an ICB PW or a DNI PW.

The first network device is an NPE device or a PE device. The second network device and the third network device are SPE devices or NPE devices, and the fourth network device is a UPE device.

Figure 15:
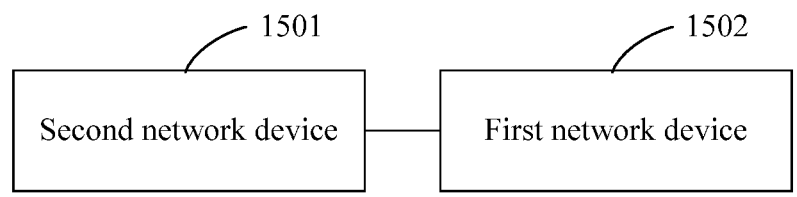
FIG. 15 is a schematic structural diagram of a system for deferring a switchback according to an embodiment of the present disclosure.

FIG. 15 is a schematic structural diagram of a system for deferring a switchback according to an embodiment of the present disclosure. The system includes the second network device 1501 for deferring a switchback according to the embodiment of the present disclosure shown in FIG. 14 and a first network device 1502.

The first network device 1502 is configured to switch back from a secondary route to a primary route after establishing the primary route to the second network device 1501, where a destination address of the secondary route is an IP address of the destination device, a next hop of the secondary route is a third network device, a destination address of the primary route is the IP address of the destination device, a next hop of the primary route is the second network device 1501, and the third network device is a secondary network device for the second network device 1501.

The structure of the second network device 1501 for deferring a switchback according to the embodiment of the present disclosure shown in FIG. 15 is similar to the structure of the second network device shown in FIG. 14. Refer to the description of the structure of the second network device shown in FIG. 14. Details are not described again herein.

The foregoing descriptions are merely example implementation manners of the present disclosure. It should be noted that a person of ordinary skill in the art may make several improvements or polishing without departing from the principle of the present disclosure and the improvements or polishing shall fall within the protection scope of the present disclosure.

What is claimed is:

1. A method for deferring a switchback, comprising:
   sending, by a first network device responsive to restoring a connection to a second network device, a query packet to the second network device to trigger the second network device to detect whether a route between the second network device to a destination device is available to enable the first network device to defer switchback from a secondary route to a primary route until the primary route is available,
   wherein the second network device is a primary network device on the primary route from the first network device to the destination device,
   wherein a third network device is a secondary network device on the secondary route from the first network device to the destination device,
   wherein the second network device is a next hop on the primary route and the third network device is a next hop on the secondary route, and
   wherein the first network device switches to the secondary route to the destination device using the third network device instead of the second network device responsive to a failure of the second network device;
   receiving, by the first network device, a query response packet from the second network device; and
   switching back, by the first network device, from the secondary route to the primary route responsive to the query response packet indicating availability of the route between the second network device and the destination device.

2. The method of claim 1, wherein the connection comprises a traffic engineering (TE) tunnel connection to the second network device.

3. The method of claim 1, wherein switching back from the secondary route to the primary route, comprises:
   creating, by the first network device, a forwarding entry of the primary route;
   activating, by the first network device, the forwarding entry; and
   forwarding, by the first network device, a data packet to the second network device using the forwarding entry.

4. The method of claim 1, further comprising generating, by the first network device, a forwarding entry of the primary route before sending the query packet to the second network device, wherein switching back from the secondary route to the primary route comprises:
   activating, by the first network device, the forwarding entry; and
   forwarding, by the first network device, a data packet to the second network device using the forwarding entry.

5. The method of claim 1, wherein the first network device is a network provider edge (NPE) device or a provider edge (PE) device, and wherein the second network device and the third network device are superstratum provider edge (SPE) devices or NPE devices.

6. A method for deferring a switchback, comprising:
   receiving, by a second network device, a query packet from a first network device responsive to restoring a connection with the first network device, wherein the second network device is a primary network device;
   detecting, by the second network device responsive to receiving the query packet, whether a route from the second network device to a destination device is available to enable the first network device to defer switchback from a secondary route to a primary route until the primary route is available,
  wherein the second network device is a primary network device on the primary route from the first network device to the destination device,
  wherein a third network device is a secondary network device on the secondary route from the first network device to the destination device,
  wherein the second network device is a next hop on the primary route and the third network device is a next hop on the secondary route, and
  wherein the first network device switches to the secondary route to the destination device using the third network device instead of the second network device responsive to a failure of the second network device; and
sending, by the second network device, a query response packet to the first network device when the route from the second network device to the destination device is available, wherein the query response packet indicates availability of the route between the second network device and the destination device, and wherein the query response packet is configured to trigger the first network device to switch back from the secondary route to the primary route.

7. The method of claim 6, wherein detecting whether the route from the second network device to the destination device is available comprises:
  querying, by the second network device, whether a backup of an Address Resolution Protocol (ARP) table from the third network device is completed; and
  querying, by the second network device, whether an ARP entry corresponding to an Internet Protocol (IP) address of the destination device exists in the backup ARP table when the second network device completes the backup of the ARP table from the third network device.

8. The method of claim 6, wherein detecting whether the route from the second network device to the destination device is available comprises:
  generating, by the second network device, an Address Resolution Protocol (ARP) table using a preset ARP configuration file; and
  querying, by the second network device, whether an ARP entry corresponding to an Internet Protocol (IP) address of the destination device exists in the ARP table.

9. The method of claim 7, further comprising detecting, by the second network device, whether a pseudo wire (PW) from the second network device to a fourth network device is available when the ARP entry corresponding to the IP address of the destination device exists, wherein the fourth network device is connected to the destination device.

10. The method of claim 7, further comprising detecting, by the second network device, whether a protection pseudo wire (PW) from the second network device to the third network device is available when the ARP entry corresponding to the IP address of the destination device exists, wherein the protection PW is an inter-chassis backup (ICB) PW or a dual-node interconnection (DNI) PW.

11. A first network device for deferring a switchback, comprising:
  a processor;
  a transmitter coupled to the processor and configured to send, responsive to restoring a connection to a second network device, a query packet to the second network device to trigger the second network device to detect whether a route between the second network device to a destination device is available to enable the first network device to defer switchback from a secondary route to a primary route until the primary route is available,
    wherein the second network device is a primary network device on the primary route from the first network device to the destination device,
    wherein a third network device is a secondary network device on the secondary route from the first network device to the destination device,
    wherein the second network device k a next hop on the primary route and the third network device is a next hop on the secondary route, and
    wherein the first network device switches to the secondary route to the destination device using the third network device instead of the second network device responsive to a failure of the second network device;
  a receiver coupled to the processor and configured to:
    receive a query response packet from the second network device; and
    send the query response packet to the processor,
  wherein the processor is configured to:
    generate the query packet;
    send the query packet to the transmitter; and
    switch back from the secondary route to the primary route after the receiver receives the query response packet from the second network device, wherein the query response packet indicates availability of the route between the second network device and the destination device.

12. The first network device of claim 11, wherein the connection comprises a traffic engineering (TE) tunnel connection to the second network device.

13. The first network device of claim 11, wherein when switching back from the secondary route to the primary route, the processor is further configured to:
  create a forwarding entry of the primary route;
  activate the forwarding entry; and
  forward a data packet to the second network device using the forwarding entry.

14. The first network device of claim 11, wherein the processor is further configured to generate a forwarding entry of the primary route, and wherein when switching back from the secondary route to the primary route, the processor is further configured to:
  activate the forwarding entry; and
  forward a data packet to the second network device using the forwarding entry.

15. The first network device of claim 11, wherein the first network device is a network provider edge (NPE) device or a provider edge (PE) device, and wherein the second network device and the third network device are superstratum provider edge (SPE) devices or NPE devices.

16. A second network device for deferring a switchback, comprising:
  a processor;
  a receiver coupled to the processor and configured to:
    receive a query packet from a first network device responsive to restoring a connection with the first network device; and
    send the query packet to the processor, wherein the second network device is a primary network device,
  wherein the processor is configured to detect, responsive to receiving the query packet, whether a route from the second network device to a destination device is available to enable the first network device to defer switchback from a secondary route to a primary route until the primary route is available,
wherein the second network device is a primary network device on the primary route from the first network device to the destination device,
wherein a third network device is a secondary network device on the secondary route from the first network device to the destination device,
wherein the second network device is a next hop on the primary route and the third network device is a next hop on the secondary route, and
wherein the first network device switches to the secondary route to the destination device using the third network device instead of the second network device responsive to a failure of the second network device; and
a transmitter coupled to the processor and configured to send a query response packet to the first network device when the route from the second network device to the destination device is available, wherein the query response packet indicates availability of the route between the second network device and the destination device, and wherein the query response packet is configured to trigger the first network device to switch back from the secondary route to the primary route.

17. The second network device of claim 16, wherein when detecting whether the route from the second network device to the destination device is available, the processor is further configured to:
query whether a backup of an Address Resolution Protocol (ARP) table from the third network device is completed; and
query whether an ARP entry corresponding to an Internet Protocol (IP) address of the destination device exists in the backup ARP table when the second network device completes the backup of the ARP table from the third network device.

18. The second network device of claim 16, wherein when detecting whether the route from the second network device to the destination device is available, the processor is further configured to:
generate an Address Resolution Protocol (ARP) table using a preset ARP configuration file; and
query whether an ARP entry corresponding to an Internet Protocol (IP) address of the destination device exists in the ARP table.

19. The second network device of claim 17, wherein the processor is configured to detect whether a pseudo wire (PW) from the second network device to a fourth network device is available when the ARP entry corresponding to the IP address of the destination device exists, and wherein the fourth network device is connected to the destination device.

20. A second network device for deferring a switchback, wherein the second network device comprises:
a transceiver configured to receive and send data information for establishing a primary route from a first network device to a destination device;
a processor coupled to the transceiver and configured to:
obtain association information, wherein the association information comprises an Internet Protocol (IP) address of a destination device and an identity of the first network device,
wherein the association information indicates that the second network device is a next-hop device of the primary route from the first network device,
wherein a destination address of the primary route is the IP address of the destination device,
wherein the second network device is a primary network device on the primary route,
wherein a third network device is a secondary network device on a secondary route from the first network device to the destination device,
wherein the third network device is a next ho on the secondary route, and
wherein the first network device switches to the secondary route to the destination device using the third network device instead of the second network device responsive to a failure of the second network device;
obtain a restored Address Resolution Protocol (ARP) table; query the restored ARP table;
obtain the IP address of the destination device in an ARP entry, wherein the IP address of the destination device identifies the destination device;
query whether a route to the destination device is available;
obtain, from the association information, the identity of the first network device corresponding to the IP address of the destination device when the route from the second network device to the destination device is available;
establish, via the transceiver, a primary route to the first network device; and
transmit a message, via the transceiver, to trigger the first network device to switch back from the secondary route to the primary route, and wherein the message indicates availability of the primary route between the second network device and the destination device.

* * * * *

UNITED STATES PATENT AND TRADEMARK OFFICE
CERTIFICATE OF CORRECTION

PATENT NO. : 11,146,484 B2
APPLICATION NO. : 15/614057
DATED : October 12, 2021
INVENTOR(S) : Zhang et al.

Page 1 of 1

It is certified that error appears in the above-identified patent and that said Letters Patent is hereby corrected as shown below:

In the Claims

Claim 11, Column 30, Line 11: "network device k a next hop" should read "network device is a next hop"

Claim 20, Column 32, Line 24: "next ho on the" should read "next hop on the"

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*